(12) United States Patent
Elashmawi et al.

(10) Patent No.: US 12,371,987 B2
(45) Date of Patent: Jul. 29, 2025

(54) INTEGRATED ON-STREAM INSPECTION VERIFICATION SYSTEM WITH ARTIFICIAL INTELLIGENCE ADVISORY TELESCOPIC STICK

(71) Applicant: SAUDI ARABIAN OIL COMPANY, Dhahran (SA)

(72) Inventors: Hatem M. Elashmawi, Udhailiyah (SA); Tarek D. Aboghoniem, Udhailiyah (SA); Shadi M. Al-Hazmi, Al-Ahsa (SA); Khalid A. Hejji, Al-Ahsa (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 185 days.

(21) Appl. No.: 18/361,640

(22) Filed: Jul. 28, 2023

(65) Prior Publication Data

US 2025/0034986 A1    Jan. 30, 2025

(51) Int. Cl.
*E21B 47/01* (2012.01)
*E21B 47/14* (2006.01)
*E21B 47/26* (2012.01)

(52) U.S. Cl.
CPC ............ *E21B 47/01* (2013.01); *E21B 47/14* (2013.01); *E21B 47/26* (2020.05)

(58) Field of Classification Search
USPC ........................................................ 324/509
See application file for complete search history.

(56) References Cited

U.S. PATENT DOCUMENTS

2022/0196445 A1 *  6/2022  Low ..................... B25J 9/1679

FOREIGN PATENT DOCUMENTS

| CN | 101509758 A | 8/2009 |
|---|---|---|
| CN | 105190231 A | 12/2015 |

OTHER PUBLICATIONS

Office Action issued by the Saudi Arabian patent office for corresponding Saudi Arabian patent application No. SA 123450842, mailed Feb. 19, 2025 (11 pages).

(Continued)

*Primary Examiner* — Farhana A Hoque
(74) *Attorney, Agent, or Firm* — Osha Bergman Watanabe & Burton LLP

(57) ABSTRACT

Methods and systems for a telescopic stick and a data gathering verification system is disclosed. The method includes receiving a schedule for an equipment structure, obtaining parameter data and an ultrasonic transducer (UT) measurement from a telescopic stick, wherein the telescopic stick is configured to generate the UT measurement representing a condition of the equipment structure at an out-of-reach condition monitoring location (CML), and determining a verification assessment, wherein the verification assessment comprises a health report for the equipment structure based on a service acceptable range criterion. The method further includes inputting the UT measurement and parameter data into an artificial intelligence model, producing a degradation prediction from the model, and updating the schedule based on the verification assessment, the degradation prediction, and a service accepted range criterion, wherein the schedule is displayed by a handheld device configured to communicate with the data gathering and verification system.

16 Claims, 9 Drawing Sheets

(56) References Cited

OTHER PUBLICATIONS

SkyVac, "SkyVac Skypole Professional High Reach Inspection Pole (You Choose)"; <https://skyvacusa.com/products/skypole-telescopic-carbon-fiber-pole>; Accessed Jul. 27, 2023 (5 pages).
"SkyPoleTM Carbon Fibre Inspection Poles", Producet Page, Ionic Systems, Access Date: Oct. 3, 2022; URL: <https://www.ionicsystems.com.au/product/skypole-carbon-fibre-inspection-poles/> (7 pages).
First Examination Report issued in Saudi Arabian Application No. 123450842, dated Nov. 7, 2024 (9 apges).

* cited by examiner

INTEGRATED ON-STREAM INSPECTION VERIFICATION SYSTEM WITH ARTIFICIAL INTELLIGENCE ADVISORY TELESCOPIC STICK

BACKGROUND

Oil and gas facilities require frequent inspection in order to ensure the integrity of equipment structures and safe work practices. On-stream inspection (OSI) is performed on equipment, such as a piping networks, while it is on-stream (i.e., in service or online) to measure thickness and detect local degradation. However, accessing equipment structures in the oil and gas facilities is becoming more difficult due to their various heights and sizes. The major challenge in the ongoing OSI program is the inspection of out-of-reach condition monitoring locations (CMLs) of the equipment structures. Where the conditions to be monitored pertain to metal corrosion condition, the term CML also refers to corrosion monitoring location.

The conventional way to inspect the out-of-reach CMLs is to erect scaffolding in order to give the inspector access to these out-of-reach CMLs to perform a thickness measurement using an ultrasonic transducer (UT) probe connected to handheld device. Inspecting out-of-reach CMLs by erecting the scaffold incurs high cost and longtime delay to conduct the required inspection. Furthermore, a challenge in the ongoing OSI program is lack of an automated verification system that provides confirmation of successful completion of OSI test and enhancements to the OSI program.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a telescopic stick for on-stream inspection (OSI) of an equipment structure, including: a first swivel joint coupling a plurality of telescopic segments to a first swivel segment; a second swivel joint coupling the first swivel segment to the second swivel segment, wherein the first swivel joint and the second swivel joint each comprise a motor configured to open and adjust both an angle and a length of the telescopic stick; an ultrasonic transducer (UT) probe comprising a camera configured to navigate the telescopic stick mounted on a mounting head attached to the second swivel segment via a spring; and an electromagnetic leg protruding from the mounting head and adjacent to the UT probe, wherein an extended length and direction of the plurality of telescopic segments exceeds a pre-determined length of human reach to allow a user accessing an out-of-reach condition monitoring location (CML) on the equipment structure, wherein the electromagnetic leg, when energized, engages the UT probe against the spring onto a ferro-magnetic surface of the equipment structure at the out-of-reach CML, wherein the engaged UT probe generates an UT measurement representing a condition of the equipment structure at the out-of-reach CML.

In one aspect, embodiments disclosed herein relate to a system for on-stream inspection (OSI) of an equipment structure, including: a telescopic stick, a data and verification system, and a handheld device. The telescopic stick including: a first swivel joint coupling a plurality of telescopic segments to a first swivel segment; a second swivel joint coupling the first swivel segment to a second swivel segment, wherein the first swivel joint and the second swivel joint each comprise a motor configured to open and adjust an angle and a length of the telescopic stick; a mounting head attached to the second swivel segment opposite the second swivel joint; an ultrasonic transducer (UT) probe comprising a camera configured to navigate the telescopic stick mounted on the mounting head via a spring; and an electromagnetic leg protruding from the mounting head and adjacent to the UT probe, wherein an extended length of the plurality of telescopic segments exceeds a pre-determined length of human reach to allow a user accessing an out-of-reach condition monitoring location (CML) on the equipment structure, wherein the electromagnetic leg, when energized, engages the UT probe against the spring onto a ferro-magnetic surface of the equipment structure at the out-of-reach CML, wherein the engaged UT probe generates an UT measurement representing a condition of the equipment structure at the out-of-reach CML. The data gathering and verification system includes a computer processor wirelessly connected to the telescopic stick, wherein the data gathering and verification system is configured to perform a method including: receiving, by the computer processor, a schedule for the equipment structure; obtaining, by the computer processor, parameter data and the UT measurement regarding the equipment structure; determining, by the computer processor and based on the UT measurement and parameter data, a verification assessment; inputting the UT measurement and the parameter data into an artificial intelligence model; producing, by the computer processor, a degradation prediction from the artificial intelligence model; and updating, by the computer processor, the schedule based on the verification assessment, the degradation prediction, and a service accepted range criterion for the equipment structure. The handheld device is configured to communicate with the data gathering and verification system and provide the schedule to a user.

In one aspect, embodiments disclosed herein relate to a method for the data gathering and verification system, including: receiving, by a computer processor, a schedule for an equipment structure; obtaining, by the computer processor, parameter data and an ultrasonic transducer (UT) measurement from a telescopic stick regarding the equipment structure, wherein the telescopic stick is configured to generate the UT measurement representing a condition of the equipment structure at an out-of-reach condition monitoring location (CML); determining, by the computer processor and based on the parameter data and UT measurement, a verification assessment for the equipment structure, wherein the verification assessment comprises a health report for the equipment structure based, at least in part, on a service acceptable range criterion; inputting the UT measurement and the parameter data into an artificial intelligence model; producing, by the computer processor, a degradation prediction from the artificial intelligence model; and updating, by the computer processor, the schedule based on the verification assessment, the degradation prediction, and a service accepted range criterion for the equipment structure, wherein the schedule is displayed by a handheld device configured to communicate with the data gathering and verification system.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
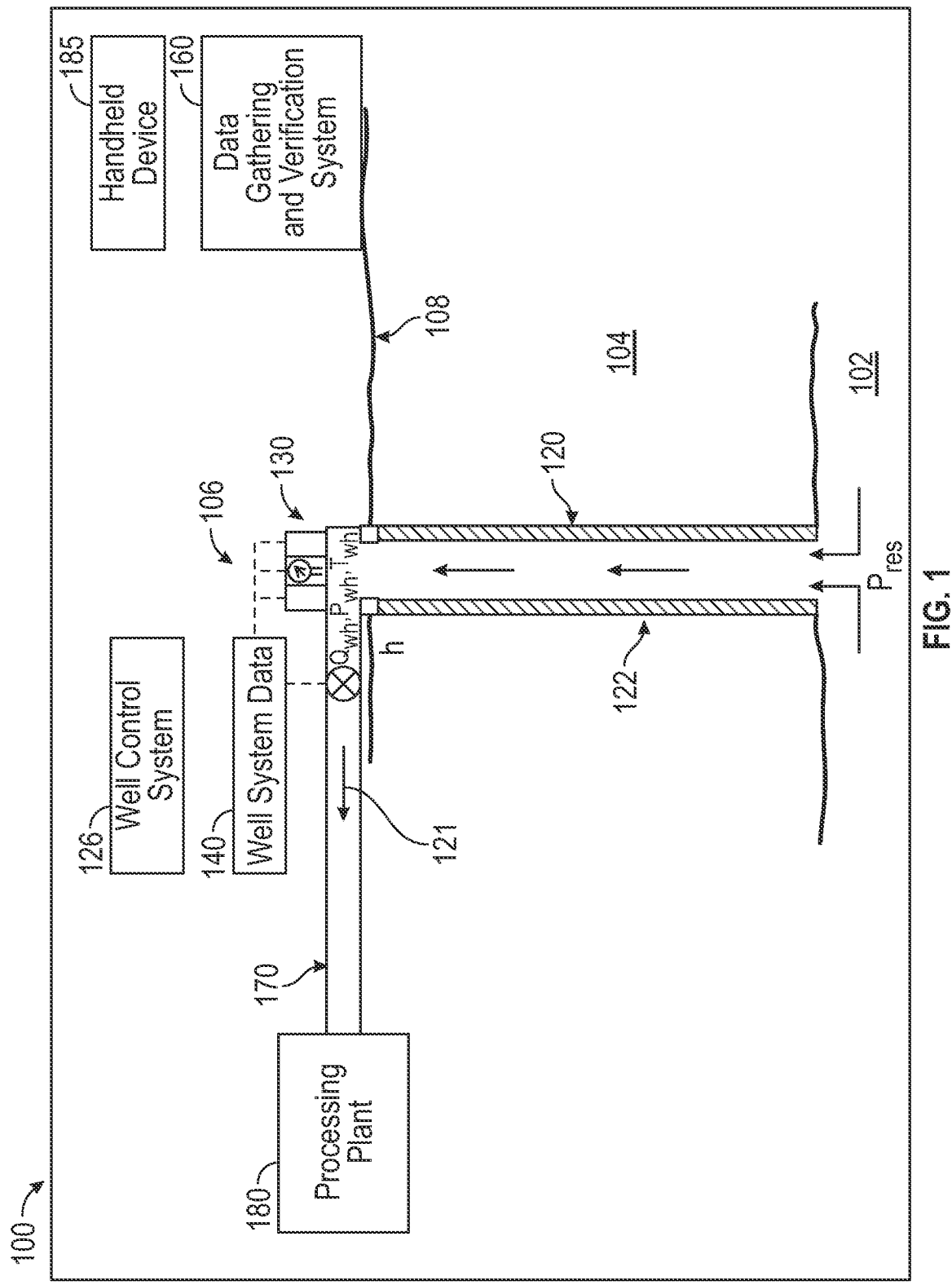
FIG. 1 shows a system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In one aspect, embodiments disclosed herein relate to a method and a tool, referred to as a telescopic stick, or a stick, for on-stream inspection (OSI) of equipment structures. In one or more embodiments, a method and a telescopic stick are used to perform OSI of equipment structures and piping networks in oil and gas facilities. Equipment structures and piping networks are placed in an OSI program, which provides a schedule for frequency of OSI and maintenance operation requirements. The OSI program includes a list of OSI points or locations and an inspection date correlating to each OSI point. Further, embodiments disclosed herein employ an enhanced OSI schedule that is based on both a time factor (i.e., duration on service) as well as other degradation factors such as process environment during the service time. Process environment may include current operating condition parameters including operating temperature, pressure, process steam compositions, acidity, etc. Some embodiments allow for OSI for out-of-reach condition monitoring locations (CMLs) by utilizing the telescopic stick. To perform these inspections in out of reach CMLs, access to equipment structures may be difficult or unfeasible due to the equipment structures being of various heights and sizes. The telescopic stick is equipped with an electromagnetic leg, a wireless flexible probe, motorized swivel joints, a control unit, and a camera for ease of mounting the UT probe and reaching out-of-reach inspection locations. Utilizing this tool increases workplace safety, reduces the amount of labor required, and eliminates the use of scaffolding resulting in cost savings.

In general, embodiments of the disclosure include systems and methods for a data gathering and verification system of various equipment structures in well systems using artificial intelligence. In some embodiments, for example, various equipment structures are actively evaluated for structural integrity while on-stream, i.e., being used in well systems. More specifically, some embodiments determine verification assessments of a particular equipment structure using parameter data and UT measurement data, such as OSI monitoring data of equipment structures at a wellsite. Some embodiments determine a degradation prediction of a particular equipment structure using artificial intelligence including a machine-learning model based on parameter data and UT measurement data. The verification assessment may be used to determine if the OSI was conducted successfully or if the OSI test needs to be reconducted. Using the verification assessments and degradation predictions, the OSI schedule may be updated for the corresponding equipment structure. The updated schedule may be used to determine whether to perform a maintenance operation on the equipment structure, as well as which type of maintenance operation to perform. The updated schedule may be used to modify or replace the original OSI schedule.

Turning to FIG. 1, FIG. 1 shows a schematic diagram of an oil and gas facility in accordance with one or more embodiments. As shown in FIG. 1, FIG. 1 illustrates a well environment (100) that includes a hydrocarbon reservoir ("reservoir") (102) located in a subsurface hydrocarbon-bearing formation ("formation") (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, capillary pressure, and resistivity. In the case of the well system (106) being operated as a production well, the well system (106) may facilitate the extraction of hydrocarbons (or "production") from the reservoir (102). The well system (106) may be part of a production system that further includes a pipeline network (170) and a processing plant (180) for transporting and processing the hydrocarbons, i.e., production from the reservoir (102).

In some embodiments, the well system (106) includes a wellbore (120), a well sub-surface system (122), and a well control system ("control system") (126). The control system (126) may control various operations of the well system (106), such as well production operations, well completion operations, well maintenance operations, and reservoir monitoring, assessment and development operations. In some embodiments, the control system (126) includes a computer system.

The wellbore (120) may include a bored hole that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "down-hole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, during operation of the well system (106), the control system (126) collects and records well system data (140) for the well system (106). The well system data (140), also referred to as "parameter data", such as a record of measurements of wellhead pressure ($P_{wh}$) (e.g., including flowing wellhead pressure), wellhead temperature ($T_{wh}$) (e.g., including flowing wellhead temperature), wellhead production rate ($Q_{wh}$) over some or all of the life of the well system (106), and water cut data. The well system data (140) may further include monitoring data of equipment structures at the wellsite such as OSI monitoring data. Throughout this disclosure, the term "equipment structure" refers to mechanical structures of equipment and piping network. In some embodiments, the measurements and monitoring data are recorded in real-time, and are available for review or use within seconds, minutes or hours of the condition being sensed (e.g., the measurements are available within 1 hour of the condition being sensed). In such an embodiment, the well system data (140) may be referred to as "real-time" well system data (140). Real-time well system data (140) may enable an operator of the well system (106) to assess a relatively current state of the well system (106), and make real-time decisions regarding development and maintenance of the well system (106) and the reservoir (102), such as on-demand adjustments in regulation of production flow from the well or preventive maintenance of equipment structures to prevent disruption to the production flow from the well.

In some embodiments, the well sub-surface system (122) includes casing installed in the wellbore (120). For example, the wellbore (120) may have a cased portion and an uncased (or "open-hole") portion. The cased portion may include a portion of the wellbore having casing (e.g., casing pipe and casing cement) disposed therein.

In some embodiments, the well system (106) includes the wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing.

In some embodiments, the well system (106) includes a data gathering and verification system (160). For example, the data gathering and verification system (160) may include hardware and/or software with functionality for facilitating operations of the well system (106), such as well production operations, well drilling operation, well completion operations, well maintenance operations, and reservoir monitoring, assessment and development operations. For example, the data gathering and verification system (160) may store well system data (140). Well system data (140) includes parameter data, such as OSI monitoring data and UT measurements. In some embodiments, the data gathering and verification system (160) may analyze the OSI monitoring data to generate recommendations to facilitate various operations of the well system (106), such as a maintenance operation of the equipment structures. While the data gathering and verification system (160) is shown at a wellsite, embodiments are contemplated the data gathering and verification system (160) is located away from well sites.

In some embodiments, the well system (106) includes a handheld device (185) that is wirelessly connected to the data gathering and verification system (160). For example, the handheld device (185) may include hardware and/or software with functionality for communicating with the data gathering and verification system (160). The data gathering and verification system (160) communicates with the handheld device (185). The handheld device (185) may display automated instructions to a user, such as field personnel.

While the OSI monitoring data is described above for equipment structures installed in the well system (106), additional and/or alternative monitoring data may correspond to equipment structures installed in the pipeline network (170) and/or the processing plant (180). In one or more embodiments, the processing plant (180) is an industrial process plant such as an oil/petroleum refinery where petroleum (crude oil) is transformed and refined, or other types of chemical processing plants. The processing plant (180) typically includes large, sprawling industrial complexes with extensive piping network running throughout, carrying streams or liquids between large chemical processing units, such as distillation columns. Processing plant facilities require frequent inspection in order to ensure the asset integrity of the structure and safe work practices. Accessing the processing plant structures and equipment can be difficult due to their various heights and sizes. Thus, embodiments disclosed herein are directed to testing equipment structures and pipeline networks associated with processing plants which can easily reach elevated locations for inspection activities.

While the oil and gas facilities are shown as including the well environment (100) and processing plant (180), in one or more embodiments, the oil and gas facilities may additionally or alternatively include equipment (pressure vessels), storage tanks, piping and an associated pipeline network.

Figure 2:
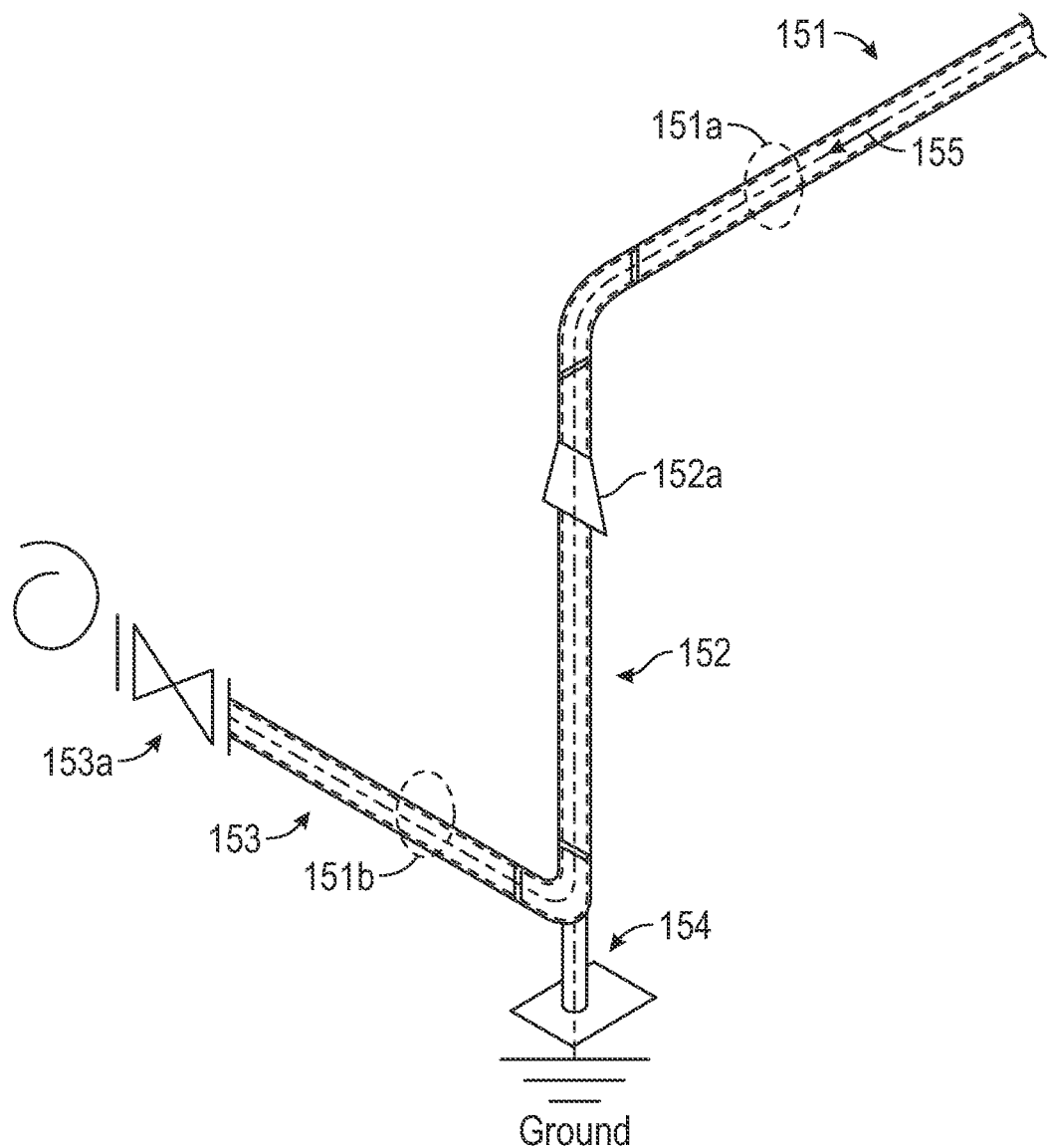
FIG. 2 shows a schematic diagram in accordance with one or more embodiments.

Turning to FIG. 2, FIG. 2 shows a schematic diagram in accordance with one or more embodiments. In one or more embodiments, one or more of the modules and/or elements shown in FIG. 2 may be omitted, repeated, and/or substituted. Accordingly, embodiments of the invention should not be considered limited to the specific arrangements of modules and/or elements shown in FIG. 2.

As shown in FIG. 2, FIG. 2 illustrates a portion of equipment structures installed in the well environment (100) and/or processing plant (180) depicted in FIG. 1 above. In particular, the equipment structure shown in FIG. 2 includes bent sections of a pipeline having an upper horizontal section (151) and lower horizontal section (153) that are connected via the vertical section (152). The pipeline is supported on the ground by way of a mechanical support structure (154). The lower horizontal section (153) includes a valve (153a) and the vertical section (152) includes a reducer (152a). Fluids flow through the pipeline during the on-stream condition as indicated by the arrow (155). For illustration purposes, the vertical section (152) has a length of maximum 10 meters from the ground level, rendering the upper horizontal section (152) out-of-reach for a human inspector standing on the ground. For example, a CML A (151a) on the upper horizontal section (152) is an out-of-reach CML. In contrast, a CML B (151b) on the lower horizontal section (153) is classified as a "within-reach" CML for the human inspector standing on the ground.

Figure 3:
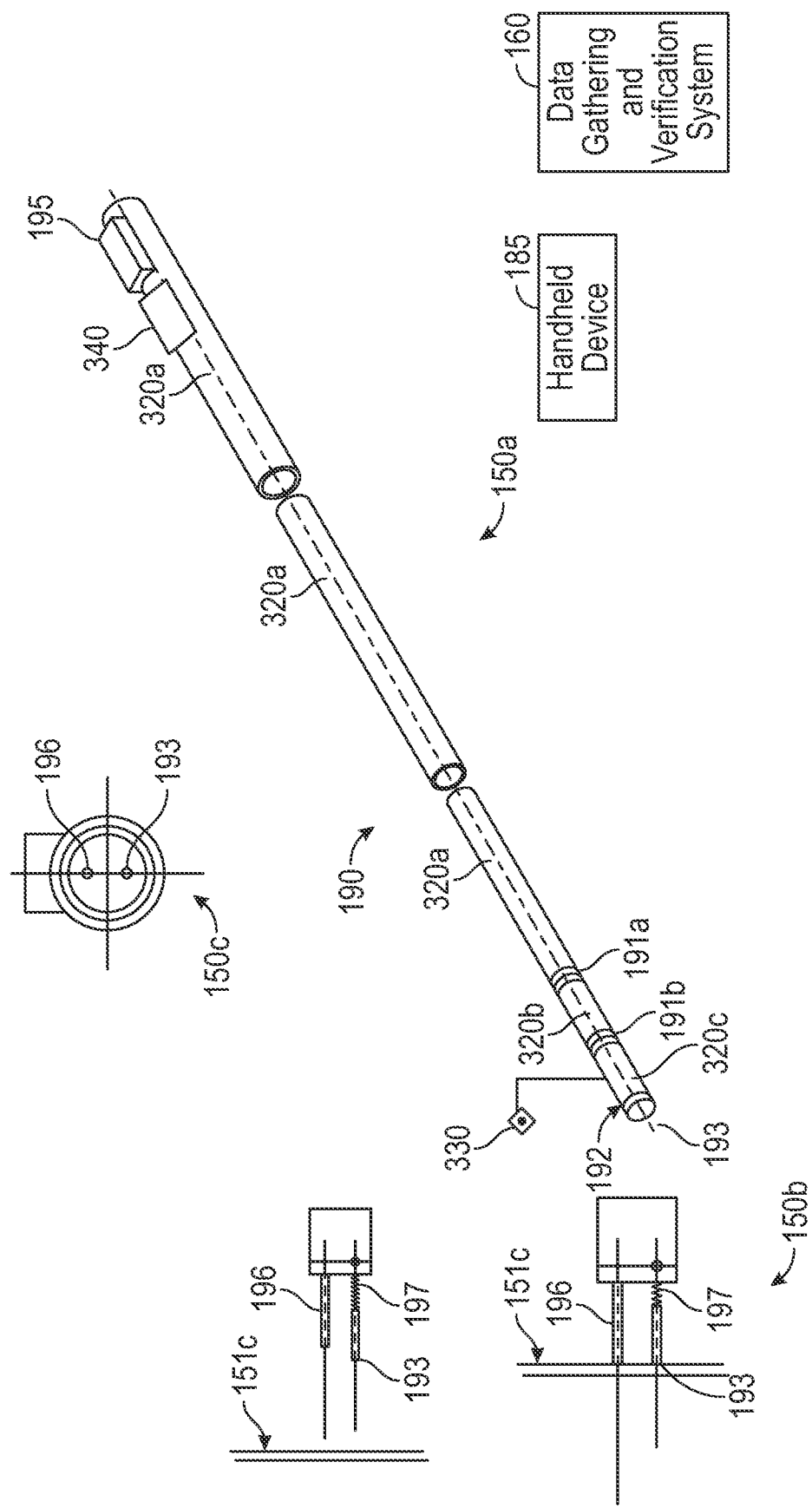
FIG. 3 shows a schematic diagram of a telescopic stick in accordance with one or more embodiments.

Turning to FIG. 3, FIG. 3 shows a schematic diagram in accordance with one or more embodiments. In one or more embodiments, one or more of the modules and/or elements shown in FIG. 3 may be omitted, repeated, and/or substituted. Accordingly, embodiments of the invention should not be considered limited to the specific arrangements of modules and/or elements shown in FIG. 3.

As shown in FIG. 3, FIG. 3 illustrates a telescopic stick (190) for online ultrasonic testing that enables an inspector to easily reach elevated locations for inspection purposes. The isometric view (150a), side view (150b), and front view (150c) collectively show a lightweight telescopic stick (190) having telescopic segments (320a) and swivel segments (320b, 320c). The lightweight telescopic stick (190) is equipped with two motorized swivel joints (191a, 191b), a mounting head (192), a battery (195), and a camera (330). For example, the length of the telescopic segments (320a) may be extended up to 9 meters to access out-of-reach CMLs to facilitate a user performing OSI of equipment and piping network from the ground. Additionally, the two motorized swivel joints (191a, 191b) include a motor in each joint with opening and angle adjustment capability to further access out-of-reach CMLs to facilitate a user performing OSI of equipment and piping network from the ground. A control unit (340) is illustrated near the battery (195) on the telescopic stick (190). The control unit (340) is wirelessly connected to the UT probe (193) and controls the motorized swivel joints (191a, 191b). The motorized swivel joints (191a, 191b) are utilized to minimize manual effort for adjusting the telescopic stick (190). The motorized swivel joints (191a, 191b) may be actuated by the control unit (340) in case of misalignment without the need of retracting the telescopic stick (190) back to the ground. The mounting head (192) has an electromagnetic leg (196) and a UT sensor probe (193) attached to a spring (197) for increased shock absorption resistance on the surface of an equipment structure under test (e.g., a pipe wall having ferro-magnetic surface material).

The UT sensor probe (193), or simply referred to as the UT probe, is a wireless device that converts electric energy into an ultrasonic vibration to be applied to a test surface and measures ultrasonic reflections from the test surface. For example, the UT probe (193) may be a piezoelectric and/or magnetostrictive device. The UT probe (193) is spring mounted on the mounting head (192) because the UT probe (193) needs to be in tight contact with the surface under test to have accurate readings. The tight contact is achieved by way of the electromagnetic leg (196) and the spring (197). For example, the surface under test may be the outer surface of a pipe wall (151c) made of ferro-magnetic material, such as iron or steel. The camera (330) is installed on the UT probe (193) designed to easily navigate the telescopic stick (190).

The electromagnetic leg (196) is an electromagnet permanently attached to the mounting head (192). The electromagnetic leg (196) is protruding from the mounting head (192) and adjacent to the UT probe (193). To perform testing on a ferro-magnetic surface, the electromagnetic leg (196) is selectively powered and energized by the battery (195) to press the UT probe (193) against the spring (197) and onto the ferro-magnetic surface of an equipment structure under test (e.g., the pipe wall (151c)). Upon completion of the test, the battery power to the electromagnetic leg (196) is disconnected to disengage the UT probe (193) from the surface of the equipment structure under test. The battery power to the electromagnetic leg (196) may be connected and/or disconnected by a user activated button/switch on the battery (195). The side view (150b) illustrates the spring (197) in a relaxed state when the UT probe (193) is disengaged from the pipe wall (151c) and in a compressed state when the UT probe (193) is engaged against the pipe wall (151c).

During operation of the telescopic stick (190), the UT probe (193) is wirelessly connected to the data gathering and verification system (160) and a handheld device (185). The handheld device (185) is a device that sends electrical power (e.g., oscillating energy) to the UT probe (193) which converts the electrical power into emitted ultrasonic wave to the equipment structure under test. The UT probe (193) measures the time of flight (i.e., delay time) of the reflected ultrasonic wave to calculate the traveling distance for determining the structure wall thickness, e.g., a UT measurement. The handheld device (185) may be a portable device carried by the user (i.e., the human inspector).

In one or more embodiments, the telescopic stick (190) performs OSI of equipment and measures wall thickness at a CML of the equipment structure, such as OSI readings and UT measurements at desired locations on the equipment. Upon completion of a test using the telescopic stick (190) at one OSI point or location, UT measurements and OSI readings are monitored and stored by the data gathering and verification system (160).

In some embodiments, a list of pre-specified corrosion monitoring locations (CMLs) to be measured in the OSI program of equipment structure in an oil and gas field is obtained. The list is referred to as the OSI CML list. For example, the list may include thousands of CMLs that are out-of-reach from an inspector on the ground but are in frequent need for taking UT measurements to monitor on-going corrosion behavior. The OSI program of equipment and piping network includes periodic rounds of OSIs performed based on an on-going basis, such as quarterly, annually, every 5 years, etc. In one or more embodiments, each CML in the list is marked on the equipment structure so that the very exact locations are repeatedly measured in each OSI round to maintain a clear record of corrosion progression (e.g., the amount of metal lost each year) for estimating the remaining lifetime of a particular portion (e.g., a pipe segment) of the equipment structure.

In some embodiments, the telescopic segments (320a) of the telescopic stick (190) may be extended and the angles may be adjusted using the motorized swivel joints (191a, 191b) to exceed a pre-determined length of human reach to allow the inspector accessing a particular out-of-reach CML on the equipment structure. For example, the telescopic stick (190) is extended based on a visual height estimate of the particular out-of-reach CML in front of the user. In one or more embodiments, the pre-determined length of human reach is set as 2.5 meters. The form of the telescopic stick (190) may be arranged for performing OSI at the particular out-of-reach CML on the equipment structure. The particular out-of-reach CML is identified based on a marking as belonging to the list of pre-specified CMLs to be measured in the OSI program. In one or more embodiments, the marking may be painted or otherwise tagged on the equipment structure at the particular out-of-reach CML to be visually identified by a user. In one or more embodiments, the marking includes a machine readable identifier (e.g., a barcode or a QR code) that is scanned using an optical scanner integrated with the UT probe (193). The visual marking information or the scanned identifier is manually or automatically compared to the list of pre-specified CMLs to confirm that the particular out-of-reach CML in front of the user is to be measured for the current round of the OSI program.

In some embodiments, the UT measurement obtained by the telescopic stick (190) represents a condition of the equipment and piping structure at the out-of-reach CML is generated by the engaged UT probe (193). In one or more embodiments, the UT measurement corresponds to a thickness of a pipe wall where the equipment structure includes a pipe at the out-of-reach CML. The UT measurement is combined with the visual marking information or the scanned machine readable identifier to generate an OSI monitoring data record of the out-of-reach CML. The OSI monitoring data records of each CML in the OSI CML list for the current round and all prior rounds of the OSI program are stored in and analyzed by the data gathering and verification system (160).

Figure 4:
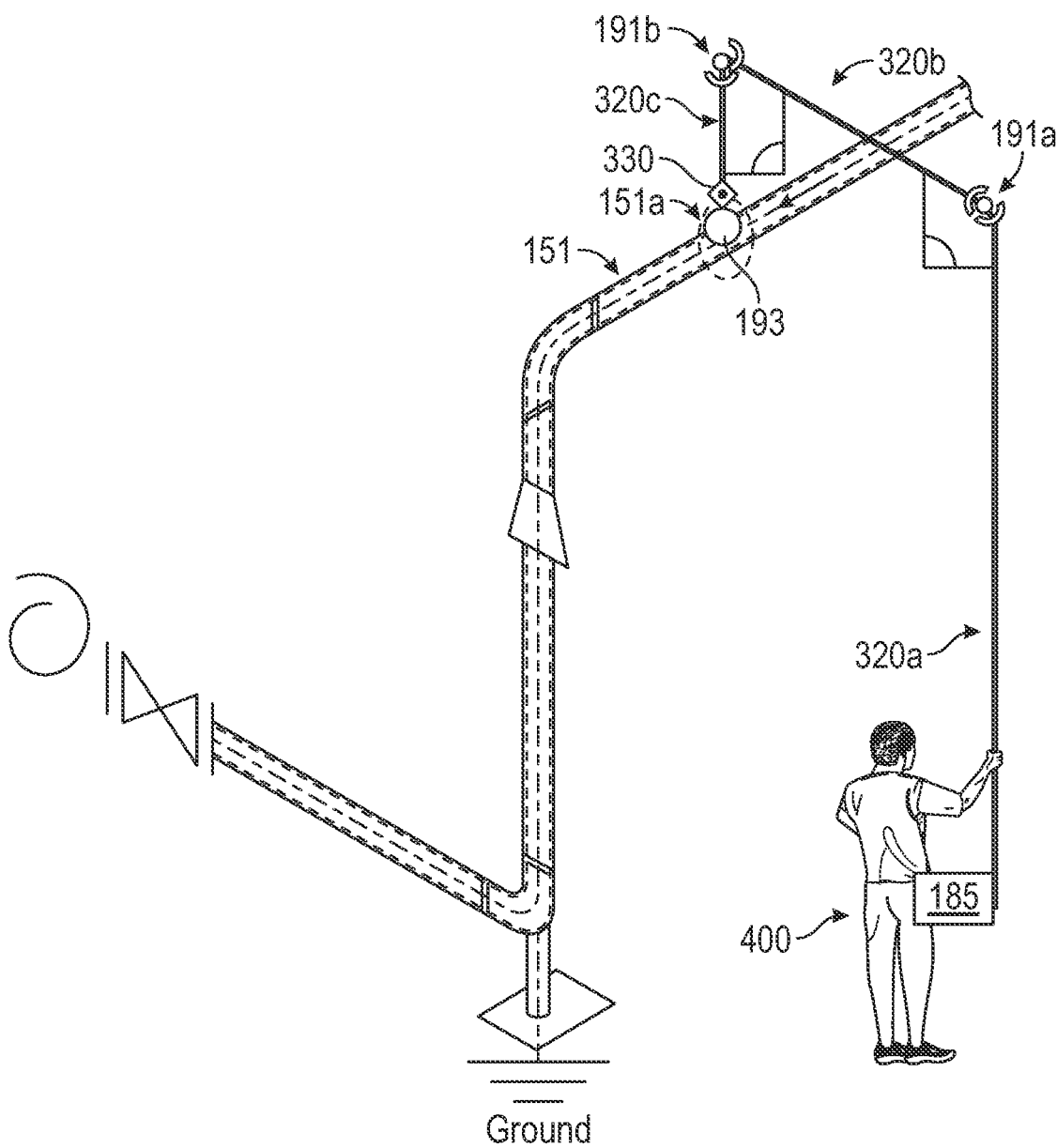
FIG. 4 shows an example of performing on-stream inspection (OSI) of equipment in accordance with one or more embodiments.

Turning to FIG. 4, FIG. 4 provides an example of performing OSI of equipment and piping network in oil and gas facilities. The example shown in FIG. 4 may employ one or more components depicted in FIGS. 1-3 above and the schematic diagram and method flowchart in FIGS. 5 and 6. In one or more embodiments, one or more of the modules and/or elements shown in FIG. 4 may be omitted, repeated, and/or substituted. Accordingly, embodiments of the invention should be considered limited to the specific arrangements of modules and/or elements shown in FIG. 4.

FIG. 4 shows an inspector (400) holding the telescopic stick (190) where two motorized swivel joints (191s, 191b) are swiveled in an angle rendering the telescopic stick (190) in a flexible form to engage the UT probe (193) onto the out-of-reach CML A (151a) on a die wall of the upper horizontal section (151) of the equipment structure. The camera (330) is used to guide the UT probe (193) onto the out-of-reach CML A (151a). In one or more embodiments, the CML A (151a) depicted in FIG. 4 is marked with a visible label for the inspector (400) to aim the UT probe (193). The visible label may include a machine readable pattern (e.g., bar code, QR code) that identifies the particular CML. The UT probe (193) may be integrated with an optical scanner to scan the machine readable pattern that is combined with the UT measurements into an OSI monitoring data record. As the inspector (400) traverses the entire equipment structure of the oil and gas facility to complete a round of OSI program, the monitoring data records of multiple CMLs may be transmitted in real time to the handheld device (185) and data gathering and verification system (160) for storage as a time-stamped OSI monitoring data log. At each CML, the OSI monitoring data record may be transmitted in real time from the UT probe (193) to the handheld device (185) wirelessly. In one or more embodiments, the time-stamped OSI monitoring data logs of ongoing periodic OSI rounds are transmitted to the data gathering and verification system (160) depicted in FIG. 1 above for storage and verification.

Figure 5:
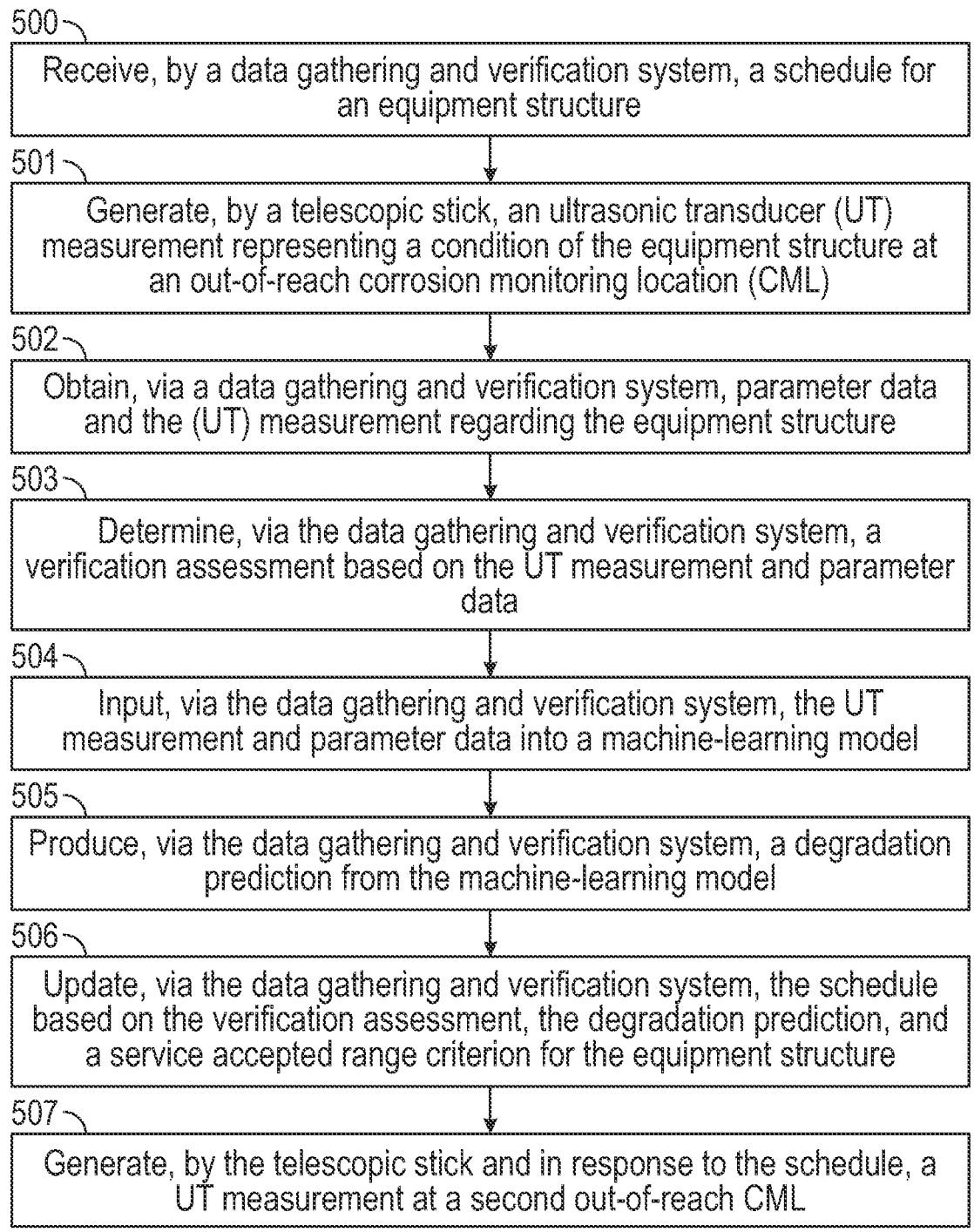
FIG. 5 shows a flowchart in accordance with one or more embodiments.

Turning to FIG. 5, FIG. 5 shows a flowchart in accordance with one or more embodiments. Specifically, FIG. 5 describes a general method for performing schedule updating and on-stream inspections (OSIs) of equipment structures and/or implementing maintenance operations on the equipment structures in accordance with one or more embodiments. One or more blocks in FIG. 5 may be performed by one or more components (e.g., data gathering and verification system X (650)) as described in FIG. 6. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially, in Block 500, a schedule for the equipment structure is received by the data gathering and verification system. The schedule may include an OSI program for the equipment structure including a list of OSI points or locations with inspection dates correlating to the OSI points. The schedule may further include previous UT measurement data.

In Block 501, an ultrasonic transducer (UT) measurement representing a condition of the equipment structure at the out-of-reach CML is generated by a telescopic stick, as described in FIG. 3. The UT measurement may represent a current wall thickness measurement of the equipment structure.

In Block 502, parameter data and the UT measurement are obtained regarding an equipment structure in an oil and gas facility, via a data gathering and verification system. For example, as discussed in FIG. 1, the data gathering and verification system (e.g., 160) may collect various types of parameter data, also referred to as well system data, such as on-stream inspection (OSI) monitoring data. OSI monitoring data may include historical (UT) measurement data representing the health condition of the equipment structure at an out-of-reach condition monitoring location (CML). The health condition includes historical wall thickness measurements of the equipment structure. The parameter data includes a list of at least one operational condition or state and a time duration for which the state was employed. The parameter data may include one or more time-series, such as values, measurements, conditions, or states over time, where each time-series represents an operating condition (e.g., temperature, flow rate, valve state (i.e., open closed), etc.).

In Block 503, a verification assessment for the equipment structure is determined based on the UT measurement and the parameter data by the data gathering and verification system. The verification assessment may include a health report for the equipment structure based on the current UT measurement and a previous UT measurement recorded in the OSI monitoring data record gathered by the data gathering and verification system as discussed in FIGS. 1-4. In some embodiments, the data gathering and verification system applies pre-defined algorithms to conduct the verification assessment. For example, in one or more embodiments, the verification assessment applies an ordered sequence of checks. In one or more embodiments, a first check determines if the current UT measurement is less than or equal to the previous UT measurement in the same location of the equipment structure. This first check may be performed by determining a differential thickness, S, represented mathematically as $$\delta = \text{current thickness} - \text{previous thickness}. \quad \text{EQ 1}$$

Thus, in one or more embodiments, the first check of the verification assessment checks if $\delta \leq 0$. If $\delta > 0$, this implies that the thickness of the equipment structure measured at the CML has increased with time. Generally, corrosion of equipment, and thus a reduction in thickness with time, is expected. As such, in one or more embodiments, failure of the first check triggers a prompt to reperform the UT measurement and/or review the history of previously acquired UT measurement(s) for accuracy. In one or more embodiments, if $\delta > 0$, the data gathering and verification system provides a prompt (e.g., message or alarm) to a handheld device associated with the telescopic stick to retake the UT measurement at the indicated CML.

In accordance with one or more embodiments, the verification assessment further applies a second check upon successful completion of the first check. The second check determines if the corrosion rate (CR) at the CML is less than or equal to a user-defined corrosion rate threshold, $Th_{CR}$. In one or more embodiments, the corrosion rate threshold, $Th_{CR}$, is 15 mils per year (mpy). The CR is determined by subtracting the current UT measurement (e.g., thickness) from the previous UT measurement and dividing the resultant quantity by the time difference between the UT measurements. Mathematically, $$CR = \frac{\text{Previous Thickness} - \text{Current Thickness}}{\text{Time Interval}} \quad \text{EQ 2}$$

where Time Interval indicates the amount of time that passed between when the previous UT measurement was acquired and the time at which the current UT measurement was acquired. As stated, the second check determines if the corrosion rate (CR) is less than or equal to a corrosion rate threshold, CR≤15 (mpy). If the CR is less than or equal to $Th_{CR}$, the second check of the verification assessment is considered acceptable, and the verification assessment may proceed to a third check. If, however, the CR is greater than the corrosion rate threshold, then an alarm is generated in the data gathering and verification system. The alarm may indicate a need to replace and/or repair the equipment structure at, or proximate to, the CML. In one or more embodiments, the alarm may further generate a recommended maintenance action and/or alter a maintenance schedule.

In accordance with one or more embodiments, the verification assessment further applies a third check upon successful completion of the second check. The third check determines if a life expectancy of the equipment structure at, or associated with the CML under test, is greater than or equal to a life expectancy threshold, $Th_{LE}$. In one or more embodiments, the life expectancy threshold, $Th_{LE}$, is equal to 10 years. The life expectancy is determined by subtracting a predefined minimum wall thickness from the current UT measurement and dividing the resultant quantity by the corrosion rate determined in the second check as previously described. Mathematically, the life expectancy (LE) is given as $$LE = \frac{\text{Current Thickness} - \text{Minimum Thickness}}{CR}$$

It is noted that the values for the minimum thickness and the life expectancy threshold may differ dependent on the equipment structure associated with CML. For example, the minimum thickness acceptable for a pipeline carrying an acidic gas may be thicker than that of a pipeline carrying a non-acidic gas. Further, the life expectancy threshold may decrease with time. That is, the life expectancy threshold may be set according to the amount of time until a future date. If the LE is greater than or equal to $Th_{LE}$, the third check of the verification assessment is considered acceptable, and the verification assessment may be considered complete. If, however, the LE is less than the life expectancy threshold, then an alarm is generated in the data gathering and verification system. The alarm may indicate a need to replace and/or repair the equipment structure at, or proximate to, the CML. In one or more embodiments, the alarm may further generate a recommended maintenance action and/or alter a maintenance schedule.

In Block 504, the UT measurement and parameter data are inputted into a machine learning model applied by the data gathering and verification system. The parameter data includes a time factor as well as process environment during service time. That is, based on both the time factor and the process environment data, the ML model can predict any potential degradation of the system. Thus, in Block 505, a degradation prediction is produced from the machine learning model via the data gathering and verification system. The degradation prediction includes an expected OSI output to identify the degradation prediction in the equipment structure. In one or more embodiments, the degradation prediction includes a thickness prediction for the equipment structure at the CML. In one or more embodiments, the thickness prediction is compared to measured thickness obtained with the telescopic stick. In one or more embodiments, the comparison includes the determination of a measured value and predicted value error, ε, given as $$\epsilon = \frac{|\text{Measured Thickness} - \text{Predicted Thickness}|}{\text{Measured Thickness}}. \quad \text{EQ 4}$$

In accordance with one or more embodiments, the error (or quantified difference between the measured and predicted thickness values) is compared to, or otherwise checked against, an error threshold, $Th_\epsilon$. In one or more embodiments, the error threshold is set to 0.05 indicative of a 5% difference between the measured thickness and the predicted thickness. If error, ε, is greater than the error threshold $Th_{LE}$, then the measured thickness is not validated and/or verified. If error, ε, is less than or equal to the error threshold $Th_{LE}$, then the measured thickness is considered validated and/or verified. In one or more embodiments, verification and/or validation of the measured thickness determines an alarm priority in view of the previously described checks (i.e., first check, second check, and third check). The alarm priority will be discussed in greater detail below (See discussion of FIGS. 7A and 7B). The alarm, and its priority, may indicate a need to replace and/or repair the equipment structure at, or proximate to, the CML. In one or more embodiments, the alarm may further generate a recommended maintenance action and/or alter a maintenance schedule. It is emphasized that the measured thickness is acquired using the telescopic stick and UT probe at the CML and the predicted thickness is determined using one or more machine-learned models of the data gathering and verification system. In one or more embodiments, the one or more machine-learned models processes parameter data to predict the thickness of an equipment structure at a given condition monitoring location (CML). In one or more embodiments, the machine-learned model further processes historical thickness values for the CML acquired using the UT probe.

Parameter data may include, but is not limited to, OSI monitoring data, well system data (when the processes of the facility are directly associated with the operation of a well), and sensory data acquired with one or more measurement or field devices disposed throughout the facility. Sensory data may include measurements pertaining to a fluid that is processed and/or transported near one or more CMLs. As such, sensory data may include any combination of temperature measurements, pressure measurements, differential pressure measurements, and flow rate measurements. Further, in one or more embodiments, a fluid (e.g., a hydrocarbon stream) processed and/or transported by a facility (e.g., gas processing facility) may be multiphase. A multiphase fluid can contain two or more constituents of a single phase of matter (e.g., liquid water and liquid oil), two or more phases of matter of a single constituent (e.g., liquid water and water vapor), or any combination of distinct constituents and phases of matter (e.g., oil, water, and gas). In one or more embodiments, sensory data acquired by the data gathering and verification system may further include the real-time composition of the fluid at, or near, one or more CMLs (e.g., acquired using a multiphase flow meter). In other embodiments, the sensory data includes the expected composition of the fluid at, or near, one or more CMLs. For example, a pipeline at a certain stage in a gas processing plant may be expected to transport an acidic gas (e.g., hydrogen sulfide (H2S) stream). In one or more embodiments, parameter data received and processed by the one or more machine-learned models may be local to a condition monitoring location (CML) under test.

In accordance with one or more embodiments, at least one result or instruction based on the verification assessment is communicated to a handheld device associated with the telescopic stick and UT probe. The at least one result or instruction may include, but is not limited to: a confirmation that the UT measurement is deemed acceptable according to all three checks (i.e., first check, second check, and third check) and within the error threshold when compared to a machine-learned prediction; a prompt to re-test; an alarm and/or recommended maintenance action; and an indication that a schedule of the data gathering and verification system has been altered and/or updated.

In Block 506, the data gathering and verification system updates the schedule based on the verification assessment, the degradation prediction, and the service accepted range criterion for the equipment structure, where the service accepted range criterion includes all thresholds and predefined values needed for the previously defined assessment checks (e.g., $Th_{LE}$, Minimum Thickness, ε, etc.). The schedule may be updated based on an initial OSI program or schedule that the equipment structure originally utilized. For example, if both the verification assessment and the degradation prediction are acceptable and matching according to the service accepted range criterion (i.e., first check, second check, and third check pass, and $\varepsilon < Th_\varepsilon$), then the schedule is provided to a user device, (e.g., handheld device (185)) notifying a user to generate a UT measurement at a second out-of-reach CML in the equipment structure using the telescopic stick (Block 507).

In some embodiments, if both the verification assessment and the degradation prediction are matching and not within the service accepted range criterion, then the schedule provided to the user device notifies the user to reconduct the OSI or UT measurement in the same CML. In some embodiments, if both the verification assessment and the degradation prediction are not matching and within the service accepted range, then the schedule provided to the user device notifies the user to reconduct the OSI or UT measurement in the same CML. The schedule may include a maintenance operation that replaces or retrofits a portion of the equipment structure at the out-of-reach CML. A maintenance operation of the equipment structure in the oil and gas facility may be performed in response to the schedule. In this context, the data gathering and verification system analyzes the schedule to facilitate performing the maintenance operation.

Figure 6:
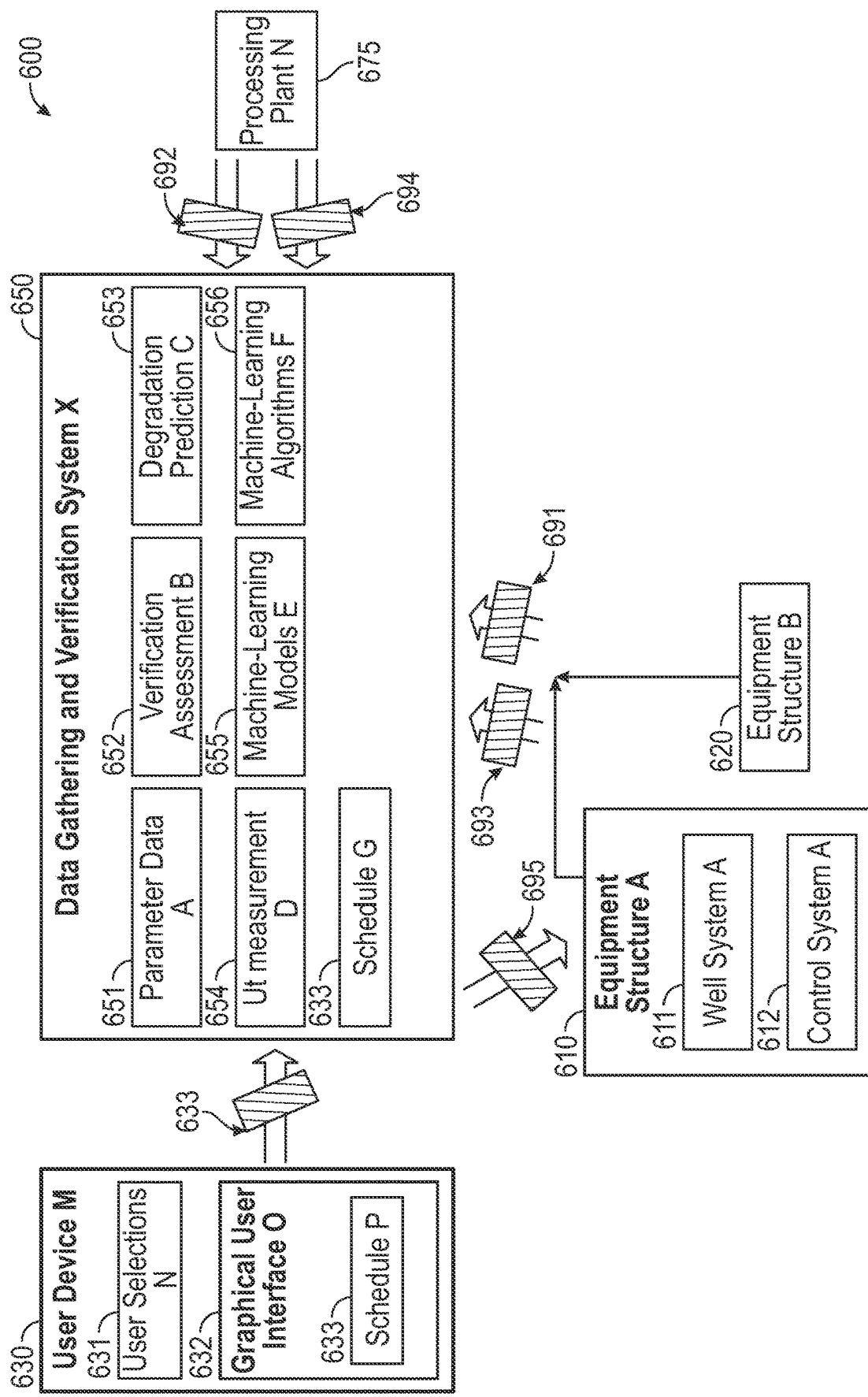
FIG. 6 shows a schematic diagram of a method in accordance with one or more embodiments.

Turning to FIG. 6, FIG. 6 shows a schematic diagram in accordance with one or more embodiments. In general, embodiments of the disclosure include a method for the data gathering and verification system (160). As shown in FIG. 6, an oil and gas system (e.g., well environment (600)) may include various equipment structures (e.g., equipment structure A (610), equipment structure B (620)), various processing plants (e.g., processing plant N (675)), and various user devices (e.g., user device M (630)), various control systems (e.g., control system A (612)), various network elements (not shown), and/or a data gathering and verification system (e.g., data gathering and verification system X (650)). In some embodiments, various types of well data (e.g., parameter data X (691), parameter data Y (692), ultrasonic transducer (UT) measurement X (694), UT measurement Y (693)) are collected over the oil and gas system. Likewise, the oil and gas system may also determine verification assessment data (e.g., verification assessment data B (652)) and/or degradation prediction data (e.g., degradation prediction data C (653)) regarding one or more equipment structures providing well systems throughout the oil and gas system. Likewise, the oil and gas system may also determine a current ultrasonic transducer (UT) measurement (e.g., UT measurement D (654)) regarding one or more equipment structures throughout the oil and gas system.

Furthermore, an equipment structure (e.g., equipment structure A (610) or equipment structure B (620)) may include a well system (e.g., well system A (611)) located in a well environment that includes a hydrocarbon reservoir ("reservoir") located in a subsurface hydrocarbon-bearing formation. The hydrocarbon-bearing formation may include a porous or fractured rock formation that resides underground, beneath the earth's surface ("surface"). In the case of the well system being a hydrocarbon well, the reservoir may include a portion of the hydrocarbon-bearing formation. The hydrocarbon-bearing formation and the reservoir may include different layers of rock having varying characteristics, such as varying degrees of permeability, porosity, and resistivity. In the case of the well system being operated as a production well, the well system may facilitate the extraction of hydrocarbons (or "production") from the reservoir. In some embodiments, the well system includes a wellbore, a well sub-surface system, a well surface system, and a well control system. The wellbore may include a bored hole that extends from the surface into a target zone of the hydrocarbon-bearing formation, such as the reservoir. The wellbore may facilitate the circulation of drilling fluids during drilling operations, the flow of hydrocarbon production ("production") (e.g., oil and gas) from the reservoir to the surface during production operations, the injection of substances (e.g., water) into the hydrocarbon-bearing formation or the reservoir during injection operations, or the communication of monitoring devices (e.g., logging tools) into the hydrocarbon-bearing formation or the reservoir during monitoring operations (e.g., during in situ logging operations). A control system (e.g., control system A (612)) in a well system may control various operations of the well system, such as well production operations, well completion operations, well maintenance operations, and reservoir monitoring, assessment and development operations. In some embodiments, the control system includes a computer system that is the same as or similar to that of computer system (802) described below in FIG. 8 and the accompanying description.

With respect to distributed control systems, a distributed control system may be a computer system for managing various processes at a facility using multiple control loops. As such, a distributed control system may include various autonomous controllers (such as remote terminal units (RTUs)) positioned at different locations throughout the facility to manage operations and monitor processes. Likewise, a distributed control system may include no single centralized computer for managing control loops and other operations. On the other hand, a SCADA system may include a control system that includes functionality for enabling monitoring and issuing of process commands through local control at a facility as well as remote control outside the facility. With respect to an RTU, an RTU may include hardware and/or software, such as a microprocessor, that connects sensors and/or actuators using network connections to perform various processes in the automation system.

Keeping with control systems, a control system may be coupled to facility equipment. Facility equipment may include various machinery such as one or more hardware components, such as pipe components, that may be monitored using one or more sensors. Examples of hardware components coupled to a control system may include crude oil preheaters, heat exchangers, pumps, valves, compressors, loading racks, and storage tanks among various other types of hardware components. Hardware components may also include various network elements or control elements for implementing control systems, such as switches, routers, hubs, PLCs, remote terminal units, user equipment, or any other technical components for performing specialized processes. Examples of sensors may include pressure sensors, flow rate sensors, temperature sensors, torque sensors, rotary switches, weight sensors, position sensors, microswitches, hydrophones, accelerometers, etc. A data gathering and verification system, user devices, and network elements may be computer systems similar to the computer system (802) described in FIG. 8 and the accompanying description.

In some embodiments, a data gathering and verification system includes functionality for determining and/or implementing an updated schedule (e.g., schedule G (633)) and/or one or more maintenance operations based on verification assessments, degradation predictions, and a service accepted range criterion. The service accepted range criterion may be predetermined values for wall thickness of the equipment structure calculated and/or obtained from the verification assessments and degradation predictions. A maintenance operation may include replacing or retrofitting a portion of the equipment structure that is part of a well system based on the equipment structure failing to satisfy a predetermined criterion. In some embodiments, a data gathering and verification system may automatically prioritize various maintenance procedures among different equipment structures instantaneously based on desired production targets and/or future plant operations.

In some embodiments, a user device (e.g., user device M (630)) may communicate with the data gathering and verification system to present the schedule to a particular user. Based on the schedule, a user device may also manage various commands for reconducting OSI or adjusting the previous schedule based on one or more user selections (e.g., user selections N (631)). The user device may also manage various commands for performing one or more maintenance operations based on one or more user selections (e.g., user selections N (631)). The user device may be a personal computer, a handheld computer device such as a smartphone or personal digital assistant, or a human machine interface (HMI). For example, a user may interact with a user interface (e.g., graphical user interface O (632)) presented on a display device) to inquire regarding corrosion states and integrity levels in one or more pipe components at a gas plant. Through user selections or automation, the data gathering and verification system may identify equipment structures that fail verification assessments and reconduct the OSI.

In some embodiments, a schedule of one or more equipment structures is generated by the data gathering and verification system X (650) upon obtaining a request (e.g., request for schedule P (633)) from a user device using input data (e.g., parameter data A (651), verification assessment data B (652), degradation prediction data C (653)). The request may be a network message transmitted between a user device and a data gathering and verification system that identifies a particular equipment structure or well system.

In some embodiments, the data gathering and verification system includes functionality for transmitting commands (e.g., command Y (695)) to one or more control systems to display the schedule or implement a particular maintenance operation. For example, the data gathering and verification system X (650) may transmit a network message over a machine-to-machine protocol to a control system in processing plant N (675). A command may be transmitted periodically, based on a user input, or automatically based on changes in parameter data, verification assessment, and degradation prediction.

Continuing with FIG. 6, a data gathering and verification system (e.g., a data gathering and verification system X (650)) may include hardware and/or software with functionality for storing and/or using one or more machine-learning models (e.g., machine-learning models E (655)) to produce degradation predictions (e.g., by inputting UT measurement and parameter data to provide a degradation prediction for the equipment structure).

Machine learning (ML), broadly defined, is the extraction of patterns and insights from data. The phrases "artificial intelligence," "machine learning," "deep learning," and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning, or machine-learned, will be adopted herein. However, one skilled in the art will recognize that the concepts and methods detailed hereafter are not limited by this choice of nomenclature.

Machine-learned model types may include, but are not limited to, generalized linear models, Bayesian regression, support vector machines, decision trees, random forests, and deep models such as neural networks, convolutional neural networks, and recurrent neural networks. Machine-learned model types, whether they are considered deep or not, are usually associated with additional "hyperparameters" that further describe the model. For example, hyperparameters providing further detail about a neural network may include, but are not limited to, the number of layers in the neural network, choice of activation functions, inclusion of batch normalization layers, and regularization strength. Commonly, in the literature, the selection of hyperparameters surrounding a machine-learned model is referred to as selecting the model "architecture." Once a machine-learned model type and hyperparameters have been selected, the machine-learned model is trained to perform a task. In some instances, hyperparameters of a model may be learned during a training process of the machine-learned model. In one or more embodiments, the machine-learned model type and training procedure may be categorized as a supervised learning process where instances of example inputs and labeled (or annotated) outputs are provided to the model during training. In other embodiments, the machine-learned model type and training procedure may be categorized as a semi-supervised learning process where only a portion of example inputs used in training have an associated labeled (or annotated) output. In these instances, unlabeled example inputs may be used during the training procedure. In one or more embodiments, multiple "rounds" of training may occur in order to determine an optimal set of hyperparameters and/or make use of newly labeled training data (e.g., in the case of semi-supervised learning). Once a machine-learned model is trained, it may be used in a production setting (also known as deployment of the machine-learned model). A brief description of various machine-learned models is provided below.

In a deep neural network, a layer of neurons may be trained on a predetermined list of features based on the previous network layer's output. Thus, as data progresses through the deep neural network, more complex features may be identified within the data by neurons in later layers. Likewise, a U-net model or other type of convolutional neural network model may include various convolutional layers, pooling layers, fully connected layers, and/or normalization layers to produce a particular type of output. Thus, convolution and pooling functions may be the activation functions within a convolutional neural network. In some embodiments, two or more different types of machine-learning models are integrated into a single machine-learning architecture, e.g., a machine-learning model may include K-nearest neighbor (k-NN) models and neural networks. In some embodiments, a reservoir simulator may generate augmented data or synthetic data to produce a large amount of interpreted data for training a particular model.

In some embodiments, various types of machine-learning algorithms (e.g., machine-learning algorithm F (656)) may be used to train the model, such as a backpropagation algorithm. In a backpropagation algorithm, gradients are computed for each hidden layer of a neural network in reverse from the layer closest to the output layer proceeding to the layer closest to the input layer. As such, a gradient may be calculated using the transpose of the weights of a respective hidden layer based on an error function (also called a "loss function"). The error function may be based on various criteria, such as mean squared error function, a similarity function, etc., where the error function may be used as a feedback mechanism for tuning weights in the machine-learning model.

In some embodiments, a machine-learning model is trained using multiple epochs. For example, an epoch may be an iteration of a model through a portion or all of a training dataset. As such, a single machine-learning epoch may correspond to a specific batch of training data, where the training data is divided into multiple batches for multiple epochs. Thus, a machine-learning model may be trained iteratively using epochs until the model achieves a predetermined criterion, such as predetermined level of prediction accuracy or training over a specific number of machine-learning epochs or iterations. Thus, better training of a model may lead to better predictions by a trained model.

With respect to support vector machines, a support vector machines may be a machine-learning model that is trained using a supervised machine-learning algorithm. For example, a support vector machine may provide a data analysis on various input features that implement a classification and regression analysis. More specifically, a support vector machine may determine a hyperplane that separates a dataset into different classes, and also determines various points (i.e., support vectors) that lie closest to different classes. Additionally, a support vector machine may use one or more kernel functions to transform data into a desired form for further processing. The term "Kernel" may refer to a set of mathematical functions that provide the window to manipulate the input data. In other words, a kernel function may transform a training set of data so that a non-linear decision surface is able to transform to a linear equation into a higher number of dimension spaces. Examples of kernel functions may include gaussian kernel functions, gaussian kernel radial basis functions (RBFs), sigmoid kernel functions, polynomial kernel functions, and linear kernel functions.

With respect to artificial neural networks, for example, an artificial neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining one or more specified outputs of the artificial neural network. Likewise, these weighted data inputs may be summed such that this sum is communicated through a neuron's activation function to other hidden layers within the artificial neural network. As such, the activation function may determine whether and to what extent an output of a neuron progresses to other neurons where the output may be weighted again for use as an input to the next hidden layer.

Turning to recurrent neural networks, a recurrent neural network (RNN) may perform a particular task repeatedly for multiple data elements in an input sequence (e.g., a sequence of temperature values or flow rate values), with the output of the recurrent neural network being dependent on past computations. As such, a recurrent neural network may operate with a memory or hidden cell state, which provides information for use by the current cell computation with respect to the current data input. For example, a recurrent neural network may resemble a chain-like structure of RNN cells, where different types of recurrent neural networks may have different types of repeating RNN cells. Likewise, the input sequence may be time-series data, where hidden cell states may have different values at different time steps during a prediction or training operation. For example, where a deep neural network may use different parameters at each hidden layer, a recurrent neural network may have common parameters in an RNN cell, which may be performed across multiple time steps. To train a recurrent neural network, a supervised learning algorithm such as a backpropagation algorithm may also be used. In some embodiments, the backpropagation algorithm is a backpropagation through time (BPTT) algorithm. Likewise, a BPTT algorithm may determine gradients to update various hidden layers and neurons within a recurrent neural network in a similar manner as used to train various deep neural networks.

Embodiments are contemplated with different types of RNNs. For example, classic RNNs, long short-term memory (LSTM) networks, a gated recurrent unit (GRU), a stacked LSTM that includes multiple hidden LSTM layers (i.e., each LSTM layer includes multiple RNN cells), recurrent neural networks with attention (i.e., the machine-learning model may focus attention on specific elements in an input sequence), bidirectional recurrent neural networks (e.g., a machine-learning model that may be trained in both time directions simultaneously, with separate hidden layers, such as forward layers and backward layers), as well as multidimensional LSTM networks, graph recurrent neural networks, grid recurrent neural networks, etc. With regard to LSTM networks, an LSTM cell may include various output lines that carry vectors of information, e.g., from the output of one LSTM cell to the input of another LSTM cell. Thus, an LSTM cell may include multiple hidden layers as well as various pointwise operation units that perform computations such as vector addition.

In some embodiments, ensemble learning methods are used to produce a hybrid-model architecture. For example, an ensemble learning method may use multiple types of machine-learning models to obtain better predictive performance than available with a single machine-learning model. In some embodiments, for example, an ensemble architecture may combine multiple base models to produce a single machine-learning model. One example of an ensemble learning method is a BAGGing model (i.e., BAGGing refers to a model that performs Bootstrapping and Aggregation operations) that combines predictions from multiple neural networks to reduce the variance of a single trained neural network model. Another ensemble learning method includes a stacking method, which may involve fitting many different model types on the same data and using another machine-learning model to combine various predictions.

Turning to random forests, a random forest model may combine the output of multiple decision trees to reach a single predicted result. For example, a random forest algorithm is made up of a collection of decision trees, where training of the random forest model determines three main hyperparameters that include node size, the number of decision trees, and the number of input features being sampled. During training, a random forest model may allow different decision trees to randomly sample from a dataset with replacement (e.g., from a bootstrap sample) to produce multiple final decision trees in the trained model. For example, when multiple decision trees form an ensemble in the random forest model, this ensemble may determine more accurate predicted data, particularly when the individual trees are uncorrelated with each other. In some embodiments, a random forest model implements a software algorithm that is an extension of a bagging method. As, a random forest model may use both bagging and feature randomness to create an uncorrelated forest of decision trees. Feature randomness (also referred to as "feature bagging") may generate a random subset of input features. This random subject may thereby result in low correlation among decision trees in the random forest model. In a training operation for a random forest model, a training operation may search for decision trees that provide the best split to subset particular data, such as through a Classification and Regression Tree (CART) algorithm. Different metrics, such as information gain or mean square error (MSE), may be used to determine the quality of a data split.

Keeping with random forests, a random forest model may be a classifier that uses data having discrete labels or classes. Likewise, a random forest model may also be used as a random forest regressor to solve regression problems. Depending on the type of problem being addressed by the random forest model, how predicted data is determined may vary accordingly. For a regression task, the individual decision trees may be averaged in a predicted result. For a classification task, a majority vote (e.g., the most frequent categorical variable) may determine a predicted class. In a random forest regressor, the model may work with data having a numeric or continuous output, which cannot be defined by distinct classes.

While FIG. 6 shows various configurations of components, other configurations may be used without departing from the scope of the disclosure. For example, various components in FIG. 6 may be combined to create a single component. As another example, the functionality performed by a single component may be performed by two or more components.

Figure 7A:
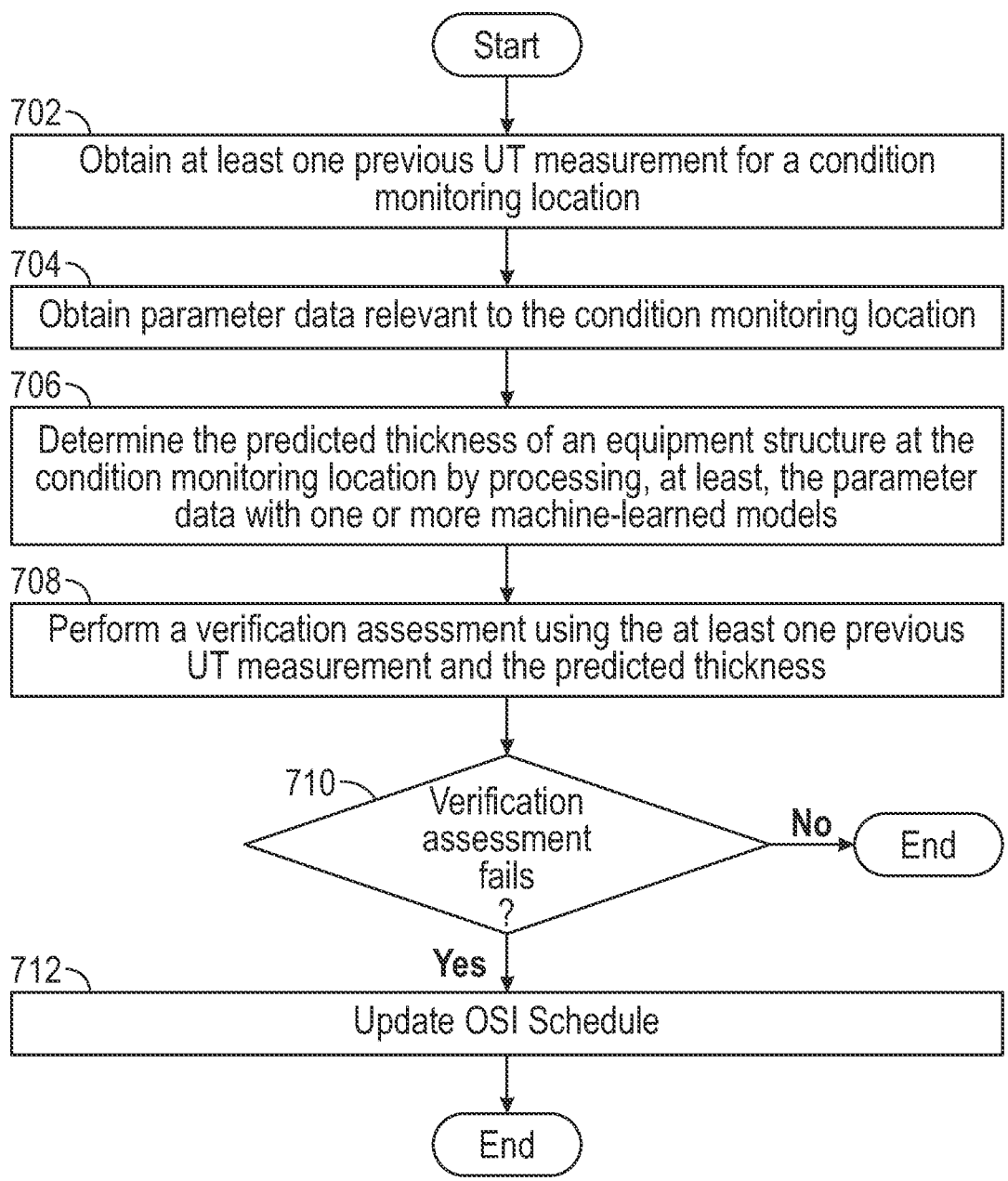
FIGS. 7A and 7B show flowcharts in accordance with one or more embodiments.
Figure 7B:
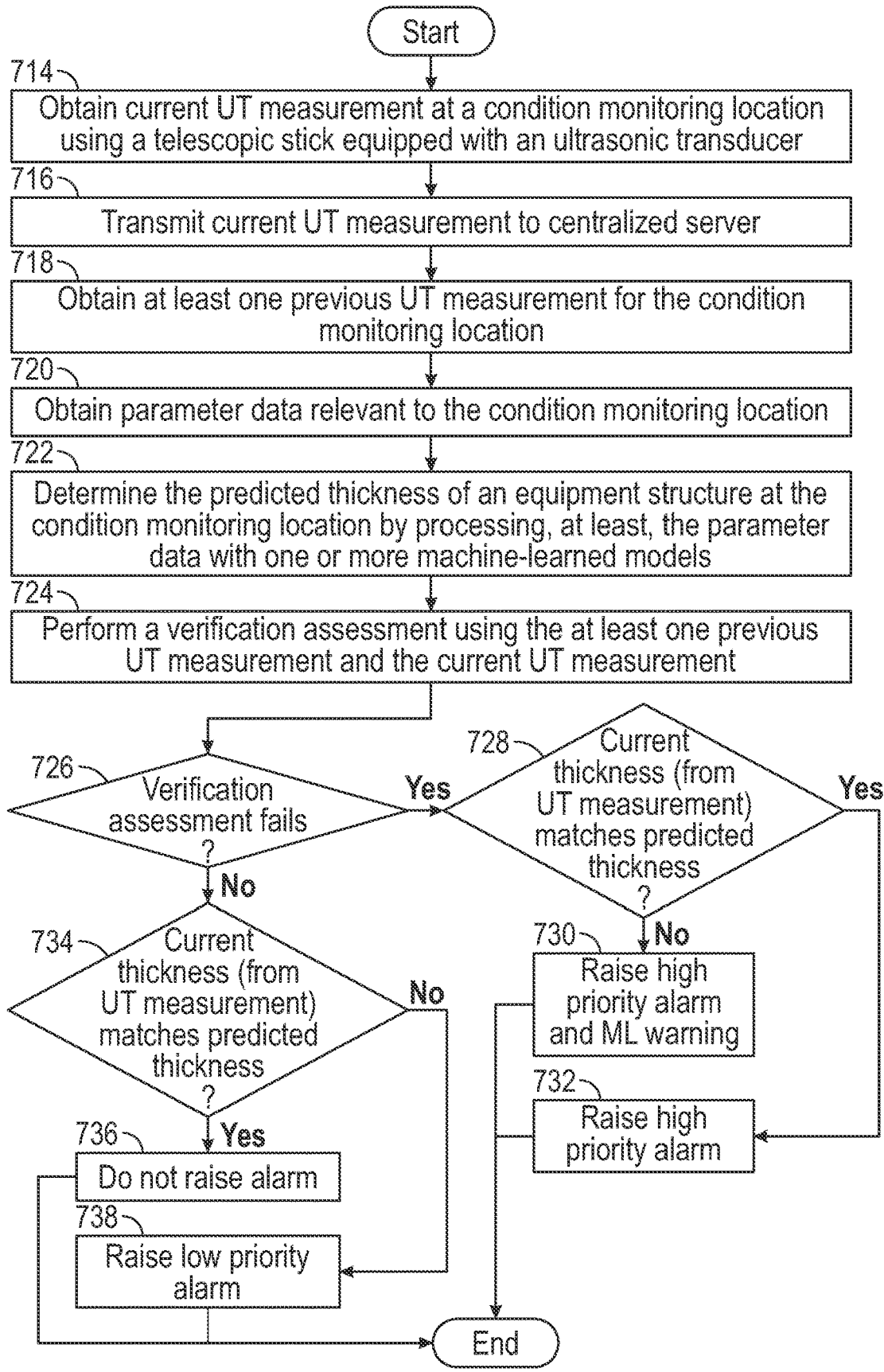

Turning to FIGS. 7A and 7B, these figures depict flow charts outlining processes of the data gathering and verification system in accordance with one or more embodiments. While FIGS. 7A and 7B are directed toward different aspects of the data gathering and verification system, in general, the steps may be run in parallel and/or interact between figures.

Initially, in Block 702 of FIG. 7A, at least one previous UT measurement is obtained for a condition monitoring location (CML) of an equipment structure. The previous UT measurement may have been obtained using a telescopic stick equipped with a UT probe at an earlier time, upon which the UT measurement was stored in a historical database of a data gathering and verification system. In one or more embodiments, at least one previous UT measurement is obtained from a historical database of the data gathering and verification system. In Block 704, parameter data relevant to the CML is obtained. In one or more embodiments, the parameter data is obtained from a historical database maintained by the data gathering and verification system. In one or more embodiments, the parameter data encompasses a service time of the equipment structure. That is, the parameter data may be formatted as a time series. Parameter data may include, but is not limited to, OSI monitoring data, well system data (when the processes of the facility are directly associated with the operation of a well), and sensory data acquired with one or more measurement or field devices disposed throughout the facility. Sensory data may include measurements pertaining to a fluid that is processed and/or transported near one or more CMLs. As such, sensory data may include any combination of temperature measurements, pressure measurements, differential pressure measurements, and flow rate measurements.

In Block 706, a predicted thickness at the CML is determined using at least one machine-learned model operating on, at least, the parameter data. In one or more embodiments, the at least one machine-learned model may further make use of the at least one previous UT measurement acquired at the CML.

In Block 708, a verification assessment is performed using the predicted thickness and the at least one previous UT measurement (i.e., previously measured thickness). In one or more embodiments, the verification assessment consists of an ordered sequence of checks. In one or more embodiments, a first check determines if the predicted thickness is less than or equal to the previously measured thickness. The second check determines if a corrosion rate (CR) at the CML is less than or equal to a user-defined corrosion rate threshold, $Th_{CR}$, where the corrosion rate is determined using the predicted thickness (along with an associated time of prediction) and the at least one previous thickness measurement. The third check determines if a life expectancy of the equipment structure at CML is greater than or equal to a life expectancy threshold, $Th_{LE}$. In one or more embodiments, threshold values (e.g., $Th_{CR}$, $Th_{LE}$)

specific to the CML are included in a service accepted range criterion, where the service accepted range criterion is stored in, or accessible to, the data gathering and verification system. The verification check of Block 708 may be performed using one or more of Equations 1-3 so long as the "current thickness" is replaced by the predicted thickness. That is, it is emphasized that the verification assessment of Block 708 is performed using the predicted thickness as determined using the one or more machine-learned models.

Block 710 represents a decision. If, while using the predicted thickness in view of the service accepted range criterion for the CML, the verification assessment passes all three checks (i.e., does not fail), then the processes of FIG. 7A terminate. If, however, any of the checks of the verification assessment fail, an OSI schedule is updated as depicted in Block 712. Failure of the verification assessment using the predicted thickness indicates that the equipment structure is predicted to be out of compliance. However, in one or more embodiments, predicted noncompliance is checked using a physically obtained measurement. As such, the OSI schedule is updated such that the CML can be inspected and directly measured as soon as is reasonably possible.

It is noted that the processes of FIG. 7A may operate continuously to monitor and predict the condition of any number of CMLs. As such, the data gathering and verification system can identify equipment structures that may be in need of repair and/or replacement before a scheduled inspection based on the actual operating condition of the facility as captured by, at least, the parameter data. Thus, the OSI schedule may be dynamically and proactively updated and tailored to a facility according to the known usage of one or more equipment structures. Further, when noncompliant equipment structures are identified before a scheduled inspection, these equipment structures may be repaired and/or replaced before a malfunction occurs. The custom-tailored preventative maintenance enabled by the data gathering and verification system disclosed herein reduces preventable and unexpected facility downtime and increases safety for facility operators.

Turning to FIG. 7B, in Block 714 a current UT measurement is obtained at a CML using a telescopic stick equipped with, at least, an ultrasonic transducer (UT). The current UT measurement may be obtained according to an OSI schedule. That is, in one or more embodiments, an operator may be directed to acquire the UT measurement based on the OSI schedule. Further, the OSI schedule may have been previously updated, for example, according to the processes of FIG. 7A. The UT measurement consists of a thickness measure for an equipment structure at the CML. In accordance with one or more embodiments, in Block 716, the current UT measurement is transmitted to a centralized server (e.g., the data gathering and verification system). In Block 718, at least one previous UT measurement for the CML is obtained. The at least one previous UT measurement may be acquired from a historical database that is part of or accessible to the data gathering and verification system. In Block 720, parameter data relevant to the CML is obtained. In one or more embodiments, the parameter data is obtained from a historical database maintained by the data gathering and verification system. In one or more embodiments, the parameter data covers a service time of the equipment structure. Parameter data may include, but is not limited to, OSI monitoring data, well system data (when the processes of the facility are directly associated with the operation of a well), and sensory data acquired with one or more measurement or field devices disposed throughout the facility. Sensory data may include measurements pertaining to a fluid that is processed and/or transported near the SML, or any other portion of a facility. As such, sensory data may include any combination of temperature measurements, pressure measurements, differential pressure measurements, and flow rate measurements.

Continuing with FIG. 7B, in Block 722, a predicted thickness at the CML is determined using at least one machine-learned model operating on, at least, the parameter data. In one or more embodiments, the at least one machine-learned model may further make use of the at least one previous UT measurement acquired at the CML.

In Block 724, a verification assessment is performed using the measured thickness (from the current UT measurement) and the at least one previous UT measurement (i.e., previously measured thickness). In one or more embodiments, the verification assessment consists of an ordered sequence of checks. In one or more embodiments, a first check determines if the measured thickness is less than or equal to the previously measured thickness(es). The second check determines if a corrosion rate (CR) at the CML is less than or equal to a user-defined corrosion rate threshold, $Th_{CR}$, where the corrosion rate is determined using the measured thickness (along with the known time at which the current UT measurement was obtained) and the at least one previous thickness measurement. The third check determines if a life expectancy of the equipment structure at CML is greater than or equal to a life expectancy threshold, $Th_{LE}$. In one or more embodiments, threshold values (e.g., $Th_{CR}$, $Th_{LE}$) specific to the CML are included in a service accepted range criterion, where the service accepted range criterion is stored in, or accessible to, the data gathering and verification system. The verification check of Block 722 may be performed using one or more of Equations 1 through 3.

Block 726 represents a decision. If any of the checks in the verification assessment of Block 724 fail, the processes of FIG. 7B proceed to Block 728. Block 728 represents another decision. In Block 728, the current thickness measurement is checked against the predicted thickness (determined in Block 722) to determine if the current thickness measurement and the predicted thickness match and are within the normal fit for service accepted range. In one or more embodiments, an error between the current thickness measurement and the predicted thickness is determined according to Equation 4. The current thickness measurement and the predicted thickness are considered to be matching if the error is less than or equal to a predefined error threshold, $Th_\varepsilon$. In one or more embodiments, the error threshold is set to 0.05. If the current thickness measurement and the predicted thickness do not match, the processes of FIG. 7B proceed to Block 730. In Block 730, a high priority alarm and machine learning (ML) warning are raised. The high priority alarm may be stored in the data gathering and verification system and communicated to a handheld device associated with the telescopic stick and UT probe. In one or more embodiments, the high priority alarm indicates to an operator of the telescopic stick and/or UT probe that the tested CML has failed the associated checks and merits additional inspection. Further, in one or more embodiments, the high priority alarm indicates that an OSI inspection should be conducted at the CML as soon as is reasonably possible. Further, because the measured thickness and the predicted thickness did not match, the ML warning indicates that an evaluation of the one or more machine-learned models that produced the predicted thickness should be conducted in view of the OSI inspection. The evaluation may include comparing the predicted thickness to an actual thickness determined as part of the OSI inspection. Dependent on the results of the evaluation, the one or more machine-learned models may be updated and/or re-trained.

If, in Block 728, the current thickness and the predicted thickness are found to be matching, a high priority alarm is raised as depicted in Block 732. The high priority alarm may be stored in the data gathering and verification system and communicated to a handheld device associated with the telescopic stick and UT probe. In one or more embodiments, the high priority alarm indicates to an operator of the telescopic stick and/or UT probe that the tested CML has failed the associated checks and merits additional inspection. Further, in one or more embodiments, the high priority alarm indicates that an OSI inspection should be conducted at the CML as soon as is reasonably possible.

Returning to Block 726, if the verification assessment is determined to be a success (because none of the checks resulted in a failure), the processes of FIG. 7B continue to Block 734. Block 734 represents the same decision as Block 728. Specifically, in Block 734, the current thickness measurement is checked against the predicted thickness (determined in Block 722) to determine if the current thickness measurement and the predicted thickness match. If the current thickness and the predicted thickness match, no alarm is raised as depicted in Block 736. In one or more embodiments, a notification is transmitted or otherwise communicated to an operator of the telescopic stick and/or UT probe that the tested CML has passed the associated checks. For example, a success confirmation may be transmitted to a handheld device associated with the telescopic stick. Further, the notification may indicate that tests may be taken at additional CMLs as scheduled, if any.

If, in Block 734, the current thickness and the predicted thickness are found to be not matching, a low priority alarm is raised as depicted in Block 738. The low priority alarm may be stored in the data gathering and verification system and communicated to a handheld device associated with the telescopic stick and UT probe. In one or more embodiments, the low priority alarm indicates to an operator of the telescopic stick and/or UT probe that the tested CML has passed the verification assessment based on the measured thickness but that the measurement thickness does not match with the predicted thickness. Further, in one or more embodiments, the low priority alarm indicates that an OSI inspection should be conducted alongside an evaluation of the one or more machine-learned models to determine the origin of the discrepancy.

Figure 8:
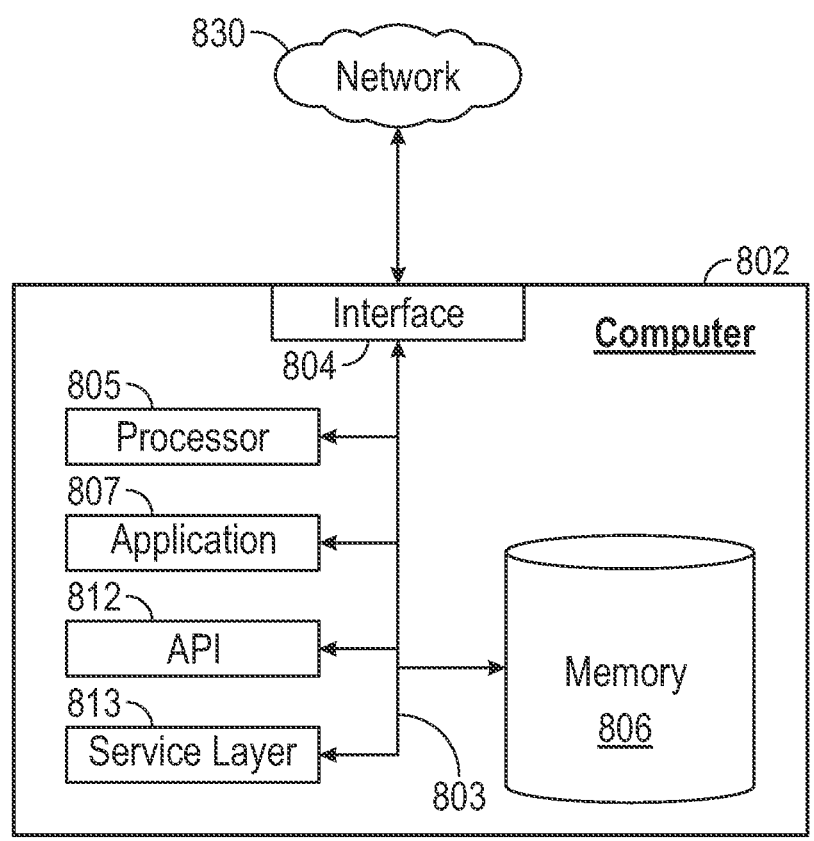
FIG. 8 shows a computer system in accordance with one or more embodiments.

Embodiments may be implemented on a computer system. FIG. 8 is a block diagram of a computer system (802) used to provide computational functionalities associated with described algorithms, methods, functions, processes, flows, and procedures as described in the instant disclosure, according to an implementation. The illustrated computer (802) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (802) may include a computer that includes an input device, such as a keypad, keyboard, touch screen, or other device that can accept user information, and an output device that conveys information associated with the operation of the computer (802), including digital data, visual, or audio information (or a combination of information), or a GUI.

The computer (802) can serve in a role as a client, network component, a server, a database or other persistency, or any other component (or a combination of roles) of a computer system for performing the subject matter described in the instant disclosure. The illustrated computer (802) is communicably coupled with a network (830). In some implementations, one or more components of the computer (802) may be configured to operate within environments, including cloud-computing-based, local, global, or other environment (or a combination of environments).

At a high level, the computer (802) is an electronic computing device operable to receive, transmit, process, store, or manage data and information associated with the described subject matter. According to some implementations, the computer (802) may also include or be communicably coupled with an application server, e-mail server, web server, caching server, streaming data server, business intelligence (BI) server, or other server (or a combination of servers).

The computer (802) can receive requests over network (830) from a client application (for example, executing on another computer (802)) and responding to the received requests by processing the said requests in an appropriate software application. In addition, requests may also be sent to the computer (802) from internal users (for example, from a command console or by other appropriate access method), external or third-parties, other automated applications, as well as any other appropriate entities, individuals, systems, or computers.

Each of the components of the computer (802) can communicate using a system bus (803). In some implementations, any or all of the components of the computer (802), both hardware or software (or a combination of hardware and software), may interface with each other or the interface (804) (or a combination of both) over the system bus (803) using an application programming interface (API) (812) or a service layer (813) (or a combination of the API (812) and service layer (813). The API (812) may include specifications for routines, data structures, and object classes. The API (812) may be either computer-language independent or dependent and refer to a complete interface, a single function, or even a set of APIs. The service layer (813) provides software services to the computer (802) or other components (whether or not illustrated) that are communicably coupled to the computer (802). The functionality of the computer (802) may be accessible for all service consumers using this service layer. Software services, such as those provided by the service layer (813), provide reusable, defined business functionalities through a defined interface. For example, the interface may be software written in JAVA, C++, or other suitable language providing data in extensible markup language (XML) format or other suitable format. While illustrated as an integrated component of the computer (802), alternative implementations may illustrate the API (812) or the service layer (813) as stand-alone components in relation to other components of the computer (802) or other components (whether or not illustrated) that are communicably coupled to the computer (802). Moreover, any or all parts of the API (812) or the service layer (813) may be implemented as child or sub-modules of another software module, enterprise application, or hardware module without departing from the scope of this disclosure.

The computer (802) includes an interface (804). Although illustrated as a single interface (804) in FIG. 8, two or more interfaces (804) may be used according to particular needs, desires, or particular implementations of the computer (802). The interface (804) is used by the computer (802) for communicating with other systems in a distributed environment that are connected to the network (830). Generally, the interface (includes logic encoded in software or hardware (or a combination of software and hardware) and operable to communicate with the network (830). More specifically, the interface (804) may include software supporting one or more communication protocols associated with communications such that the network (830) or interface's hardware is operable to communicate physical signals within and outside of the illustrated computer (802).

The computer (802) includes at least one computer processor (805). Although illustrated as a single computer processor (805) in FIG. 8, two or more processors may be used according to particular needs, desires, or particular implementations of the computer (802). Generally, the computer processor (805) executes instructions and manipulates data to perform the operations of the computer (802) and any algorithms, methods, functions, processes, flows, and procedures as described in the instant disclosure.

The computer (802) also includes a memory (806) that holds data for the computer (802) or other components (or a combination of both) that can be connected to the network (830). For example, memory (806) can be a database storing data consistent with this disclosure. Although illustrated as a single memory (806) in FIG. 8, two or more memories may be used according to particular needs, desires, or particular implementations of the computer (802) and the described functionality. While memory (806) is illustrated as an integral component of the computer (802), in alternative implementations, memory (806) can be external to the computer (802).

The application (807) is an algorithmic software engine providing functionality according to particular needs, desires, or particular implementations of the computer (802), particularly with respect to functionality described in this disclosure. For example, application (807) can serve as one or more components, modules, applications, etc. Further, although illustrated as a single application (807), the application (807) may be implemented as multiple applications (807) on the computer (802). In addition, although illustrated as integral to the computer (802), in alternative implementations, the application (807) can be external to the computer (802).

There may be any number of computers (802) associated with, or external to, a computer system containing computer (802), each computer (802) communicating over network (830). Further, the term "client," "user," and other appropriate terminology may be used interchangeably as appropriate without departing from the scope of this disclosure. Moreover, this disclosure contemplates that many users may use one computer (802), or that one user may use multiple computers (802).

In some embodiments, the computer (802) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A telescopic stick for on-stream inspection (OSI) of an equipment structure, the telescopic stick comprising:
    a first swivel joint coupling a plurality of telescopic segments to a first swivel segment;
    a second swivel joint coupling the first swivel segment to the second swivel segment,
    wherein the first swivel joint and the second swivel joint each comprise a motor configured to open and adjust both an angle and a length of the telescopic stick;
    an ultrasonic transducer (UT) probe comprising a camera configured to navigate the telescopic stick mounted on a mounting head attached to the second swivel segment via a spring; and
    an electromagnetic leg protruding from the mounting head and adjacent to the UT probe,
    wherein an extended length and direction of the plurality of telescopic segments exceeds a pre-determined length of human reach to allow a user accessing an out-of-reach condition monitoring location (CML) on the equipment structure,
    wherein the electromagnetic leg, when energized, engages the UT probe against the spring onto a ferro-magnetic surface of the equipment structure at the out-of-reach CML,
    wherein the engaged UT probe generates an UT measurement representing a condition of the equipment structure at the out-of-reach CML.

2. The telescopic stick according to claim 1,
    wherein the extended length and direction is achieved by actuating the motor to adjust both the angle and the length of the telescopic stick.

3. The telescopic stick according to claim 2,
    wherein the UT probe scans a machine readable identifier at the out-of-reach CML,
    wherein the UT measurement is combined with the scanned machine readable identifier to generate an OSI monitoring data record of the out-of-reach CML.

4. The telescopic stick according to claim 1, wherein a maintenance operation is performed on the equipment structure.

5. The telescopic stick according to claim 4, wherein the maintenance operation comprises replacing or retrofitting a portion of the equipment structure at the out-of-reach CML.

6. A system for on-stream inspection (OSI) of an equipment structure, comprising:
    a telescopic stick comprising:
        a first swivel joint coupling a plurality of telescopic segments to a first swivel segment;
        a second swivel joint coupling the first swivel segment to a second swivel segment,
        wherein the first swivel joint and the second swivel joint each comprise a motor configured to open and adjust an angle and a length of the telescopic stick;
        a mounting head attached to the second swivel segment opposite the second swivel joint;

an ultrasonic transducer (UT) probe comprising a camera configured to navigate the telescopic stick mounted on the mounting head via a spring; and
an electromagnetic leg protruding from the mounting head and adjacent to the UT probe,
wherein an extended length of the plurality of telescopic segments exceeds a pre-determined length of human reach to allow a user accessing an out-of-reach condition monitoring location (CML) on the equipment structure,
wherein the electromagnetic leg, when energized, engages the UT probe against the spring onto a ferro-magnetic surface of the equipment structure at the out-of-reach CML,
wherein the engaged UT probe generates an UT measurement representing a condition of the equipment structure at the out-of-reach CML,
a data gathering and verification system comprising a computer processor wirelessly connected to the telescopic stick, wherein the data gathering and verification system is configured to perform a method comprising:
receiving, by the computer processor, a schedule for the equipment structure;
obtaining, by the computer processor, parameter data and the UT measurement regarding the equipment structure;
determining, by the computer processor and based on the UT measurement and parameter data, a verification assessment;
inputting the UT measurement and the parameter data into an artificial intelligence model;
producing, by the computer processor, a degradation prediction from the artificial intelligence model; and
updating, by the computer processor, the schedule based on the verification assessment, the degradation prediction, and a service accepted range criterion for the equipment structure; and
a handheld device configured to communicate with the data gathering and verification system and provide the schedule to a user.

7. The system according to claim 6,
wherein the extended length and direction is achieved by actuating the motor to adjust both the angle and the length of the telescopic stick.

8. The system according to claim 6,
wherein the parameter data comprises historical UT measurement data comprising a thickness measurement of the equipment structure at an out-of-reach condition monitoring location (CML), a time factor during a service time, and process environment data during the service time.

9. The system according to claim 6,
wherein the verification assessment comprises a health report based, at least in part, on the service accepted range criterion.

10. The system according to claim 6,
wherein the artificial intelligence model comprises a machine-learning model, wherein the machine-learning model comprises a decision tree.

11. The system according to claim 6,
wherein the schedule comprises a maintenance operation that replaces or retrofits a portion of the equipment structure at the out-of-reach CML.

12. The system according to claim 6,
wherein the UT probe scans a machine readable identifier at the out-of-reach CML,
wherein the UT measurement is combined with the scanned machine readable identifier to generate an OSI monitoring data record of the out-of-reach CML.

13. A method for a data gathering and verification system, comprising:
receiving, by a computer processor, a schedule for an equipment structure;
obtaining, by the computer processor, parameter data and an ultrasonic transducer (UT) measurement from a telescopic stick regarding the equipment structure, wherein the telescopic stick is configured to generate the UT measurement representing a condition of the equipment structure at an out-of-reach condition monitoring location (CML);
determining, by the computer processor and based on the parameter data and UT measurement, a verification assessment for the equipment structure, wherein the verification assessment comprises a health report for the equipment structure based, at least in part, on a service acceptable range criterion;
inputting the UT measurement and the parameter data into an artificial intelligence model;
producing, by the computer processor, a degradation prediction from the artificial intelligence model; and
updating, by the computer processor, the schedule based on the verification assessment, the degradation prediction, and a service accepted range criterion for the equipment structure, wherein the schedule is displayed by a handheld device configured to communicate with the data gathering and verification system.

14. The method of claim 13, further comprising:
performing a maintenance operation of the equipment structure based, at least in part, on the updated schedule.

15. The method of claim 13,
wherein the artificial intelligence model comprises a machine-learning model,
wherein the machine-learning model comprises a decision tree.

16. The method according to claim 13,
wherein the parameter data comprises historical UT measurement data comprising a thickness measurement of the equipment structure at an out-of-reach condition monitoring location (CML), a time factor during a service time, and process environment data during the service time.

* * * * *